UNITED STATES PATENT OFFICE.

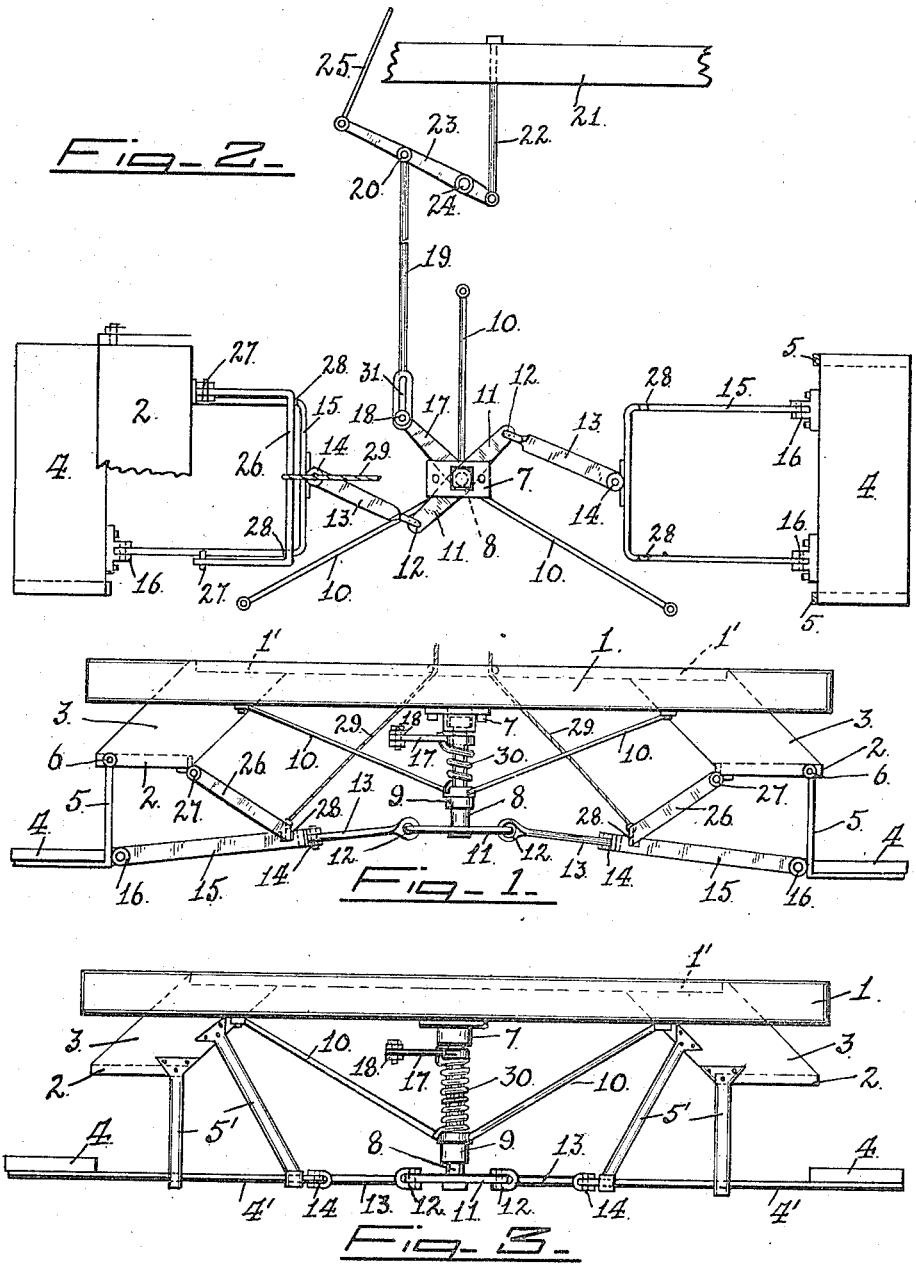

DOUGLAS RANDOLPH MAYHEW, OF SHINGLE SPRINGS, CALIFORNIA.

AUTOMATIC EXTENSION CAR-STEP.

1,227,642.　　　　　　　Specification of Letters Patent.　　　Patented May 29, 1917.

Application filed March 6, 1917. Serial No. 152,512.

*To all whom it may concern:*

Be it known that I, DOUGLAS RANDOLPH MAYHEW, a citizen of Canada, residing at Shingle Springs, in the county of Eldorado and State of California, have invented certain new and useful Improvements in Automatic Extension Car-Steps, of which the following is a specification.

My invention relates to a movable step, particularly adapted for railway cars and other similar vehicles, which may be retracted, when not in use, so as not to project beyond the side of the car.

The use of such a step permits the platform of the car to be made wider than is now customary, for the reason that the movable step, when extended to its operative position, may project beyond the side of the car for any reasonable distance, and yet be capable of being retracted entirely out of the way when the car is moving.

The object of the invention is to provide such a step, of the simplest possible construction, whose operation will be automatically controlled by the stopping and starting of the car, so that, under ordinary circumstances, no additional duties will be imposed upon the operator or trainman. This is accomplished, broadly speaking, by connecting the step with the brake mechanism of the car, in a manner to be hereinafter described, so that said step is extended when the brakes are set, and retracted when the brakes are released.

The invention is herewith illustrated, and will be presently described, in its preferred form, namely as a single bottom step movably secured to the lowest fixed step of the well known type of railway car platform, and connected, for operation, with the usual brake system of the car. It is to be understood, however, that the device may be applied to other forms of vehicles, such, for example, as street-cars and road-running omnibuses, and that it may be actuated by any type of brake mechanism employed upon such vehicles, and that other changes, within the scope of the claims hereto appended, may be made in the device without departing from the spirit of the invention.

With this in view, the invention will now be fully described with reference to the accompanying drawings, wherein—

Figure 1 is an end elevation showing a portion of a car platform with my automatic extension steps associated therewith.

Fig. 2 is a plan view showing my extension steps and the connections for operating the same.

Fig. 3 is an end elevation of a modified form of my extension step.

Referring more particularly to the drawings, the reference numeral 1 designates the end member of the platform frame of a railway car, upon which the platform 1' is carried, the remainder of the car being omitted for the sake of simplifying the drawings. Said platform has the usual fixed steps 2 at its sides, carried by suitable hangers or supports 3. In the drawings, I have shown but one fixed step 2 at each side of the platform, but it is to be understood that the device hereinafter described may be applied regardless of the number of fixed steps.

An extension step 4, Fig. 1, is movably secured to the fixed step 2, or to the lowest fixed step if there be more than one, by means of brackets or hangers 5, pivotally secured to said fixed step at 6, and designed to permit the extension step 4 to be swung inwardly from its extended, or operative position, shown in the drawings, so that said extension step does not project beyond the fixed step 2, or beyond the side of the platform frame 1.

Secured to the under side of the platform frame 1 is a journal bracket 7, in which is rotatably mounted a vertical shaft 8. The lower portion of said shaft is guided by a journal collar 9, held by suitable fixed diagonal braces 10.

At its lower end, said shaft 8 carries a double arm 11, whose ends are pivotally connected, at 12, with links 13, the latter being pivotally connected, at 14, with yokes 15 extending inwardly from the extension steps 4 and hinged thereto, as shown at 16. Thus by partial rotation of the shaft 8, the extension steps 4 are simultaneously retracted or extended.

The shaft 8 carries at its upper end a laterally extending arm 17, which is connected at 18, with one end of a rod 19, Fig. 2, whose other end 20 is connected to some portion of the brake operating mechanism of the car. In Fig. 2 of the drawings I have shown at 21 a portion of a brake beam, understood to be of the type commonly employed in railway cars. This is connected by a link 22 with one end of a double arm lever 23, fulcrumed at 24. A rod 25 extends from the other arm of said lever and is understood to be connected with the usual brake operating device, which device forms no part of the present invention, and is, therefore, not illustrated in the drawings. It is to be understood, however, that said brake operating device may be an air cylinder, a hand wheel or lever, or any other device adapted for operating the brake mechanism. The rod 19 is connected, as shown at 20, with the lever 23, so that as said lever is moved rearwardly to set the brakes, the extension steps 4 are moved into their extended positions.

The steps 4 may be retained in their extended positions by means of latch members 26, hinged at 27 to the rear of the fixed steps 2, and adapted to drop into notches 28 in the upper edges of the yokes 15, as shown particularly in Fig. 1. Said latch members are provided with suitable means, preferably cords 29, by which they may be raised out of said notches 28. Said cords 29 are shown as passing upwardly through the platform 1', and it is to be understood that they may be carried to any convenient position in the car, or if it be so desired, all the cords of a car or a train of cars may be connected together, so that all the movable steps may be simultaneously released. A spring 30, surrounding the shaft 8, is provided for retracting the steps 4 upon the release of the latches 26, and the connection 18, between the brake operating mechanism and the step mechanism, is slotted at 31 as shown in Fig. 2, to permit the brake mechanism to be released without withdrawing the steps.

It will be seen that, by this construction, the movable steps 4 are automatically extended when the brakes are applied to stop the car. Said steps may then be retained in extended position, either by leaving the brakes set, or by means of the latch members 26. If the latter method is employed, the brakes may be released as soon as the car is brought to a stop, and when the car is about to be again started, the steps are released, by means of the cords 29, and are at once retracted by the spring 30. If the latch members 26 are not used, the action of the steps is entirely automatic; that is, when the brakes are set to stop the car, the steps are extended, and when the brakes are released, to permit the car to be started, the steps are retracted.

In Fig. 3 of the drawings I have illustrated a modification of my invention, in which the movable steps 4 are carried upon sliding members 4', the latter being mounted within suitable brackets 5' depending from the fixed step support 3. The inner ends of the slides 4' are connected, at 14, with the links 13, and the latter are connected, at 12, with the ends of the double arm lever 11 secured to the lower end of the vertical shaft 8. Thus the movable steps 4 are retracted and extended by a horizontal sliding movement, instead of a swinging movement, as in the previously described form; in other respects the two forms are identical. The latch mechanism has been omitted from Fig. 3, for the sake of clearness, but it is to be understood that such mechanism may be used in connection with the sliding step as well as with the swinging step.

I claim:—

1. In a railway car having a brake operating mechanism, a movable step adapted to be extended to and retracted from its operative position, and a connection between said step and said brake operating mechanism for operating said step automatically by the movement of said brake mechanism.

2. In a railway car having a brake operating mechanism, a movable step adapted to be extended to and retracted from its operative position, a connection between said step and said brake mechanism for extending said step automatically by the operation of said brake mechanism, and means for retracting said step independently of the movements of said brake mechanism.

3. In a railway car having a brake operating mechanism, a movable step adapted to be extended to and retracted from its operative position, a connection between said step and said brake mechanism whereby the former is automatically extended by the operation of the latter, and means for retaining said step in extended position.

4. In a railway car having a brake operating mechanism, a movable step adapted to be extended to and retracted from its operative position, a connection between said step and said brake mechanism whereby the former is automatically extended by the operation of the latter, means for retaining said step in extended position, and means for retracting said step independently of the movements of said brake mechanism.

5. In a railway car having a brake operating mechanism, a movable step adapted to be extended to and retracted from its operative position, a connection between said step and said brake mechanism whereby the former is extended by the operation of the latter, a latch member for retaining said step in extended position, means for controlling said latch member independently of the brake mechanism, and a spring for retracting said step upon the release of said latch.

6. In a railway car having a brake operating mechanism and a platform having fixed steps at the sides thereof, an extension step movably carried below said fixed steps, upon each side; a vertical shaft rotatably carried below said platform and between said steps; a system of levers and links connecting said shaft with said steps, whereby said steps are extended and retracted by the rotation of said shaft; and a system of levers and links connecting said shaft with said brake mechanism, whereby said steps are operated by the movement of said brake mechanism.

7. In a railway car having a brake operating mechanism and a platform having fixed steps at the sides thereof, an extension step movably carried below said fixed steps, upon each side; a vertical shaft rotatably carried below said platform and between said steps; a system of levers and links connecting said shaft with said steps, whereby said steps are extended and retracted by the rotation of said shaft; a system of levers and links connecting said shaft with said brake mechanism, whereby said steps are extended when said brake mechanism is operated to stop the car; latch members for retaining said steps in extended position; means for controlling said latch members independently of the brake mechanism; and a spring for retracting said steps upon the release of said latch members.

8. In a railway car having a brake operating mechanism, a movable step adapted to be extended to and retracted from its operative position, and mechanical means connecting said step with said brake mechanism for automatically operating said step simultaneously with the operation of said brake mechanism.

In testimony whereof I have signed my name to this specification in the presence of two subscribing witnesses.

DOUGLAS RANDOLPH MAYHEW.

Witnesses:
JOHN S. BETTENCOURT,
Mrs. L. A. HARVEY.

Copies of this patent may be obtained for five cents each, by addressing the "Commissioner of Patents, Washington, D. C."